US008973140B2

(12) United States Patent
Shnowske et al.

(10) Patent No.: US 8,973,140 B2
(45) Date of Patent: Mar. 3, 2015

(54) HANDLING INFORMATION SECURITY INCIDENTS

(71) Applicant: Bank of America Corporation, Charlotte, NC (US)

(72) Inventors: Daniel P. Shnowske, Waxahachie, TX (US); Okan Demirmen, Seneca, SC (US); Ronald Ramcharran, Paramus, NJ (US); Timothy C. Metzger, Hoboken, NJ (US)

(73) Assignee: Bank of America Corporation, Charlotte, NC (US)

( * ) Notice: Subject to any disclaimer, the term of this patent is extended or adjusted under 35 U.S.C. 154(b) by 37 days.

(21) Appl. No.: 13/827,200

(22) Filed: Mar. 14, 2013

(65) Prior Publication Data
US 2014/0283049 A1 Sep. 18, 2014

(51) Int. Cl.
G08B 23/00 (2006.01)
G06F 21/55 (2013.01)

(52) U.S. Cl.
CPC .................. G06F 21/55 (2013.01)
USPC ................................ 726/23; 726/25

(58) Field of Classification Search
USPC ..................... 726/22–25, 11–15
See application file for complete search history.

(56) References Cited

U.S. PATENT DOCUMENTS

| 7,870,609 | B2 * | 1/2011 | Hulten et al. | 726/22 |
| 8,037,144 | B2 * | 10/2011 | Lund et al. | 709/206 |
| 8,413,238 | B1 * | 4/2013 | Sutton | 726/23 |
| 8,533,821 | B2 * | 9/2013 | Crume | 726/22 |
| 8,707,431 | B2 * | 4/2014 | Stephens et al. | 726/23 |
| 2004/0064351 | A1 | 4/2004 | Mikurak | |
| 2004/0107125 | A1 | 6/2004 | Guheen et al. | |
| 2004/0255167 | A1 | 12/2004 | Knight | |
| 2005/0005129 | A1 | 1/2005 | Oliphant | |
| 2005/0160095 | A1 | 7/2005 | Dick et al. | |
| 2006/0101517 | A1 | 5/2006 | Banzhof et al. | |
| 2006/0107318 | A1 | 5/2006 | Jeffries et al. | |
| 2006/0178918 | A1 | 8/2006 | Mikurak | |
| 2006/0259775 | A2 | 11/2006 | Oliphant | |
| 2007/0061266 | A1 | 3/2007 | Moore et al. | |
| 2007/0101422 | A1 | 5/2007 | Carpenter | |
| 2007/0118756 | A2 | 5/2007 | Oliphant | |
| 2007/0156659 | A1 | 7/2007 | Lim | |
| 2007/0186282 | A1 * | 8/2007 | Jenkins | 726/22 |
| 2009/0248696 | A1 | 10/2009 | Rowles et al. | |

(Continued)

Primary Examiner — Nirav B Patel
(74) Attorney, Agent, or Firm — Banner & Witcoff, Ltd.; Michael A. Springs

(57) ABSTRACT

Methods, systems, computer-readable media, and apparatuses for handling information security incidents are presented. In some embodiments, a computing device may receive information indicating that a network address is associated with an information security incident. Subsequently, the computing device may monitor activity associated with the network address. Based on the monitoring, the computing device may determine whether the network address represents an information security threat. In response to determining that the network address represents an information security threat, the computing device may cause one or more remediation actions to be performed. In some arrangements, the information security incident may be a denial of service attack. In additional or alternative arrangements, the network address may be located in a particular net block, and the computing device may evaluate one or more remediation criteria, which may include analyzing network activity for one or more other addresses that are located within the net block.

18 Claims, 5 Drawing Sheets

(56) References Cited

U.S. PATENT DOCUMENTS

| | | |
|---|---|---|
| 2009/0249482 A1 | 10/2009 | Sarathy |
| 2009/0249484 A1 | 10/2009 | Howard et al. |
| 2009/0254572 A1 | 10/2009 | Redlich et al. |
| 2010/0115578 A1 | 5/2010 | Nice et al. |
| 2010/0250497 A1 | 9/2010 | Redlich et al. |
| 2011/0251868 A1 | 10/2011 | Mikurak |
| 2011/0321033 A1 | 12/2011 | Kelkar et al. |
| 2012/0004945 A1 | 1/2012 | Vaswani |
| 2012/0089410 A1 | 4/2012 | Mikurak |
| 2012/0159632 A1* | 6/2012 | Barriga et al. .................. 726/24 |
| 2012/0259722 A1 | 10/2012 | Mikurak |
| 2013/0104251 A1 | 4/2013 | Moore et al. |
| 2013/0160129 A1* | 6/2013 | Sartin et al. .................... 726/25 |
| 2013/0219502 A1 | 8/2013 | Danford et al. |
| 2013/0246334 A1 | 9/2013 | Ahuja et al. |
| 2013/0246335 A1 | 9/2013 | Ahuja et al. |
| 2013/0246336 A1 | 9/2013 | Ahuja et al. |
| 2013/0246431 A1 | 9/2013 | Ahuja et al. |

\* cited by examiner

HANDLING INFORMATION SECURITY INCIDENTS

BACKGROUND

Aspects of the disclosure relate to computer hardware and software. In particular, one or more aspects of the disclosure generally relate to computer hardware and software for handling information security incidents.

Large organizations, such as financial institutions, may be subject to, and accordingly may need to handle and/or resolve, many different kinds of threats, including information security threats. Some examples of the types of information security threats that such an organization may face include denial of service (DOS) attacks, phishing schemes, and the like.

In using conventional systems and techniques to identify, manage, mitigate, resolve, and/or otherwise handle various kinds of information security threats, an organization, such as a financial institution, may expend a great deal of resources. For example, conventional systems and techniques that might be used to address these threats may require a great deal of manual input and oversight and might not be able to effectively and/or efficiently scale to handle the volume of analysis and/or other processing that might be needed to appropriately address these threats.

As a result, these conventional systems and techniques might result in an inefficient use of resources (including computer processing resources in addition to human resources), as well as frustration on the part of administrators and/or other users who might oversee and/or otherwise manage these systems and techniques. Moreover, because of their various limitations, these conventional systems and techniques might not be able to appropriately address all of the information security threats that the organization and its various computer systems may face.

SUMMARY

Aspects of the disclosure relate to various systems and techniques that provide more effective, efficient, scalable, user-friendly, and convenient ways of handling information security incidents and information security threats.

For example, some embodiments discussed in greater detail below provide methods and systems that can monitor and evaluate information security incidents and automatically respond to incidents that are determined to be threats (e.g., by performing various remediation actions and/or by causing various remediation actions to be performed). In some instances, these information security incidents may be denial-of-service attacks that may be launched by one or more hijacked computer networks, which are sometimes referred to as "bot nets." In responding to such an information security incident, the systems and techniques discussed below may identify network addresses for the computer networks, systems, and/or devices from which the attack originates, and/or may evaluate various communications associated with the incident to determine whether the attack should be classified as an information security threat (which in turn may trigger a remediation response).

In some instances, a system implementing one or more aspects of the disclosure may evaluate communications from one or more network addresses over a period of time and subsequently may be determine whether these communications represent an information security threat that requires a remediation response (or whether these communications do not represent such a threat and do not require such a response, e.g., because the communications are inadvertent, insignificant, or otherwise do not rise to a sufficient level to warrant a response). In cases where a remediation response is required, the system may automatically perform (or cause the performance of) various remediation actions, which may include identifying a service provider for the network address, generating and sending a notification to the provider, and periodically checking on the network address to determine whether the notification (and/or other remediation actions) have been effective in resolving the threat posed by the network address. In cases where the network address continues to pose a threat after initial remediation actions have been performed, the system may automatically follow up with the provider and/or escalate the situation as may be necessary and/or desired.

Moreover, in some situations, in addition to monitoring and analyzing activity associated with a single network address which has been linked to a particular information security incident, a system implementing various aspects of the disclosure may also monitor and analyze activity associated with other network addresses in the same net block as the network address linked to the incident (e.g., within the same grouping of addresses that represents a distinct network, subnet, or other grouping of addresses as the network address linked to the incident). Then, in evaluating the network address linked to the incident (e.g., to determine whether the network address poses an information security threat requiring a remediation response), the system may also consider the activity associated with the other network addresses. In other words, the network addresses of a single net block may, in some instances, be evaluated together in determining whether certain communications pose an information security threat and/or whether a remediation response is warranted.

In some cases, where a number of network addresses from the same net block are considered together, this analysis may result in a determination that the network addresses do, in fact, pose an information security threat and that a remediation response is warranted, where if the network addresses were only considered individually, such a determination might not be reached (e.g., because the communication(s) from each individual address might not rise to a sufficient level to meet a threshold above which a remediation response is triggered). By aggregating and/or compiling network activity information for network addresses that are located in the same net block and analyzing this information collectively, the systems and techniques discussed in greater detail below can make better decisions (e.g., than conventional systems) in identifying, responding to, and/or otherwise handling information security threats. Moreover, this approach to information security threats may better reflect the observation that when a certain computer in a network is compromised, the likelihood of other computers in the same network and/or subnet also being compromised is greatly increased.

By leveraging various aspects of these techniques and/or the other features and functionalities discussed in greater detail below, information security incidents and/or information security threats can be handled in more effective, efficient, scalable, and convenient ways, as various embodiments discussed in greater detail below can reduce the amount of resources that are consumed, as well as the amount of oversight that might otherwise be required, in carrying out and/or facilitating various information security functions and/or processes. Additionally, this can be achieved while providing improved recognition and/or handling of such information security incidents and threats.

Thus, in some embodiments discussed below, a computing device may receive information indicating that a network address is associated with an information security incident. Subsequently, the computing device may monitor activity associated with the network address. Based on the monitoring, the computing device may determine whether the network address represents an information security threat. In response to determining that the network address represents an information security threat, the computing device may cause one or more remediation actions to be performed. In some arrangements, the information security incident may be a denial of service attack. In additional or alternative arrangements, the network address may be located in a particular net block, and the computing device may evaluate one or more remediation criteria, which may include analyzing network activity for one or more other addresses that are located within the net block.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate to handling information security incidents. Before discussing these concepts in greater detail, however, an example of a computing device that can be used in implementing various aspects of the disclosure, as well as an example of an operating environment in which various embodiments can be implemented, will first be described with respect to FIGS. 1A and 1B.

Figure 1A:
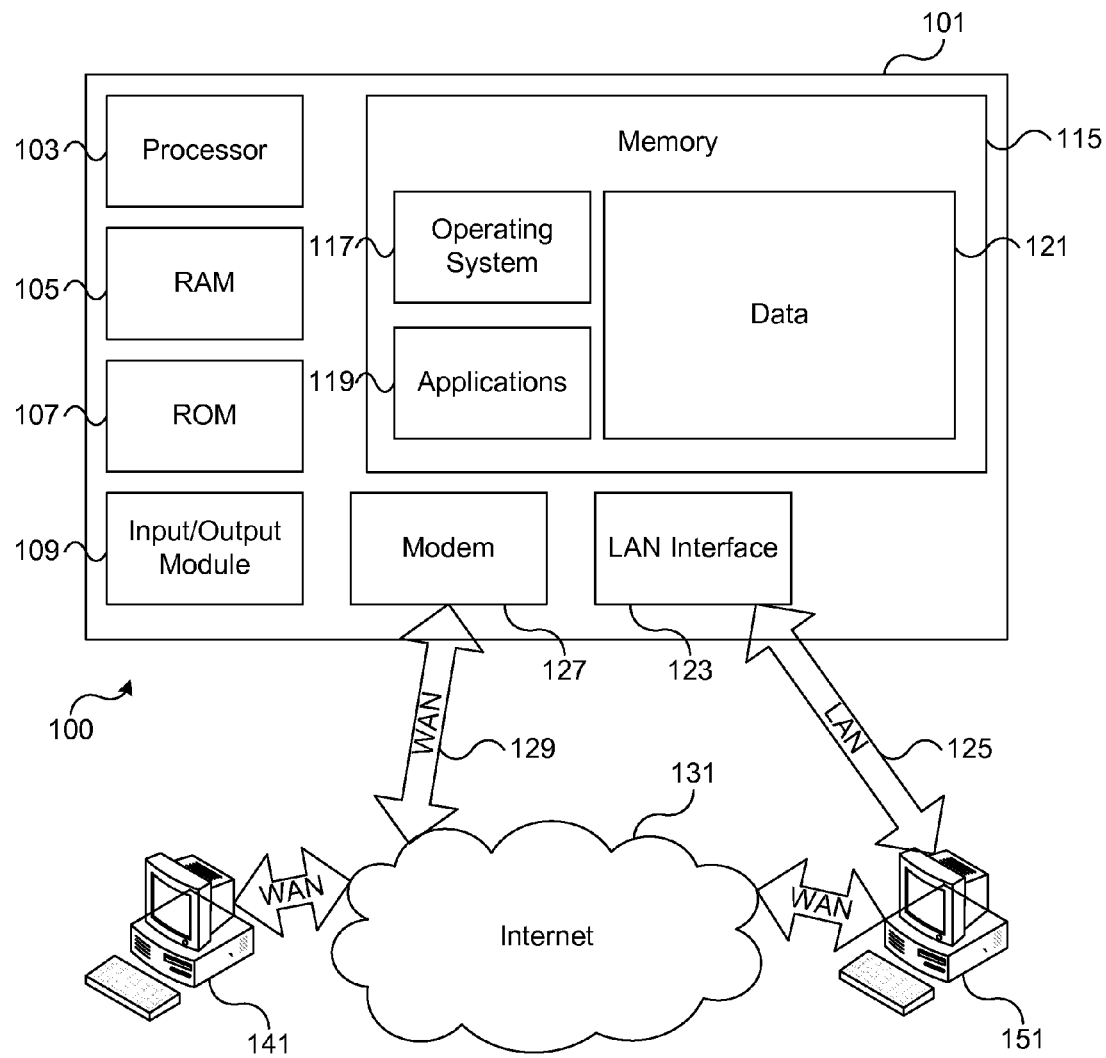
FIG. 1A illustrates an example operating environment in which various aspects of the disclosure may be implemented.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and so on) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
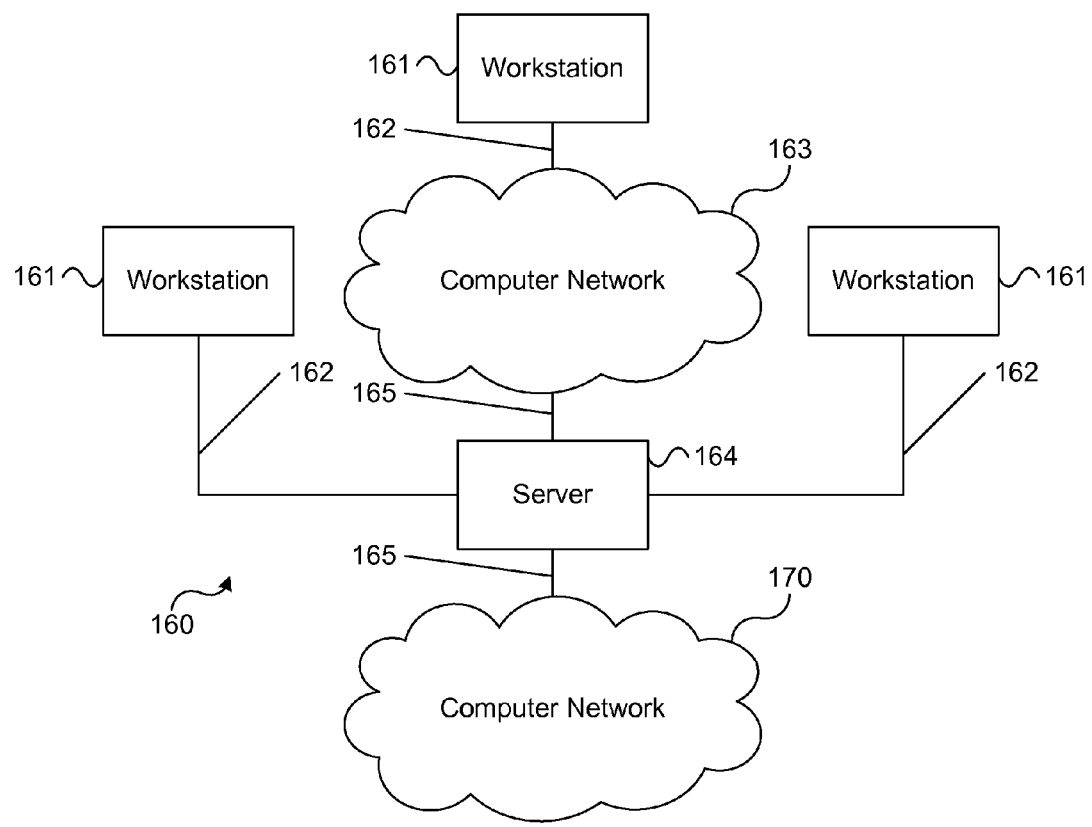
FIG. 1B illustrates another example operating environment in which various aspects of the disclosure may be implemented.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

As introduced above, some aspects of the disclosure generally relate to handling information security incidents. In the discussion below, various examples illustrating how information security incidents can be identified, evaluated, and/or remediated in accordance with one or more embodiments will be provided.

Figure 2:
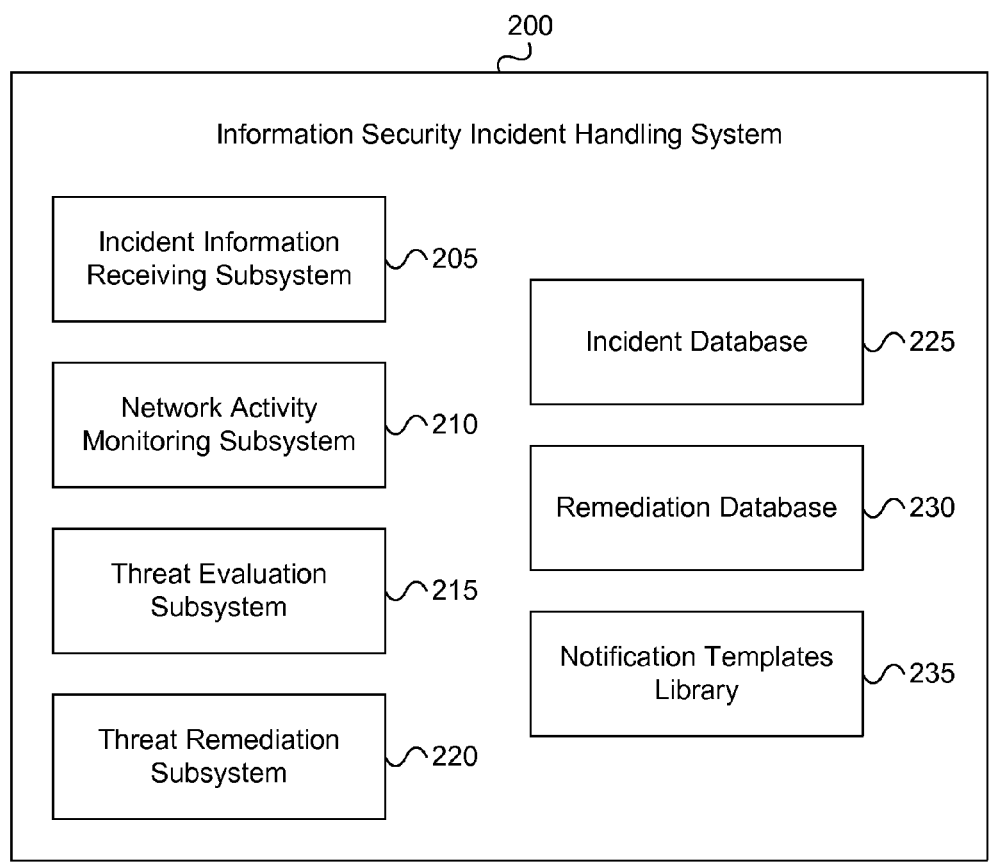
FIG. 2 illustrates an example of a system for handling information security incidents according to one or more embodiments.

FIG. 2 illustrates an example of a system 200 for handling information security incidents according to one or more embodiments. In some embodiments, system 200 may be implemented in one or more computing devices, which may include and/or incorporate one or more processors, one or more memories, and/or one or more aspects of the computing device 101 discussed above. In some instances, system 200 may include a number of different subsystems, databases, and/or libraries. In some arrangements, all of the subsystems included in system 200 may be included in and/or incorporated into a single computing device, while in other arrangements, each subsystem included in system 200 (and/or combinations thereof) may be included in and/or incorporated into a distinct and/or dedicated computing device. In addition, each of the databases and/or libraries included in system 200 may be included in and/or incorporated into the same computing device as one or more other subsystems of system 200, or, in other arrangements, may be included in and/or incorporated into distinct and/or dedicated computing devices (which, e.g., are communicatively coupled to and/or otherwise accessible to system 200 and/or its various subsystems).

As seen in FIG. 2, in some embodiments, system 200 may include an incident information receiving subsystem 205, a network activity monitoring subsystem 210, a threat evaluation subsystem 215, a threat remediation subsystem 220, an incident database 225, a remediation database 230, and a notification templates library 235. This arrangement represents one example configuration of system 200. In other embodiments, one or more elements of system 200 may be combined and/or additional and/or alternative subsystems may be included in addition to and/or instead of those shown in FIG. 2.

In some embodiments, incident information receiving subsystem 205 may be configured to receive information indicating that a particular network address (e.g., an Internet Protocol (IP) address or the like) has been linked to and/or is otherwise associated with an information security incident. For example, incident information receiving subsystem 205 may include one or more interfaces, such as one or more communication interfaces, that may be configured to receive information about one or more information security incidents and/or one or more network addresses (which may, e.g., be involved in such incidents) from another system (e.g., an incident detection system that is distinct and/or separate from system 200) and/or another subsystem of system 200 (which may, e.g., be configured to detect such information security incidents). In some arrangements, incident information receiving subsystem 205 may itself be configured to detect information security incidents (e.g., based on network activity logs that incident information receiving subsystem 205 may store and/or access from another system, subsystem, or database). As discussed above, the information security incidents may, in some instances, be denial of service attacks that have been launched against one or more computer systems operated by an organization. In other instances, these information security incidents may additionally or alternatively include other types of attacks, such as phishing attempts.

In some embodiments, network activity monitoring subsystem 210 may be configured to collect, maintain, update, and/or otherwise monitor network activity information for various network addresses. In some instances, network activity monitoring subsystem 210 may receive information about the network addresses to be monitored (such as, for instance, information identifying these addresses) from incident information receiving subsystem 205. Additionally or alternatively, in monitoring network activity information for various network addresses, network activity monitoring subsystem 210 may track inbound and/or outbound communications (e.g., data packets, messages, and/or other communications) across various ports of various network interfaces. These network interfaces may, for instance, be network interfaces of system 200 and/or may be network interfaces of one or more other systems and/or subsystems to which system 200 may be communicatively coupled (and/or which system 200 may be configured to monitor, e.g., for network security purposes). In some instances, in monitoring network activity, network activity monitoring subsystem 210 may, for example, communicate with one or more systems and/or subsystems to obtain access logs and/or other records that include information about inbound and/or outbound communications with other devices, networks, and/or the like. Such logs may, for example, indicate when particular communications happened, what addresses particular communications were sent to and/or received from, the sizes of particular communications (e.g., in bits and/or bytes), the types of particular communications (e.g., whether particular communications were TCP/IP communications, UDP communications, and/or other types of communications), and/or other information about various communications.

In some embodiments, threat evaluation subsystem 215 may be configured to determine, based on monitoring (such as monitoring that may, e.g., be performed by network activity monitoring subsystem 210), whether a particular network address (such as a network address that may, e.g., have been identified by incident information receiving subsystem 205) represents an information security threat. For example, threat evaluation subsystem 215 may perform various types of analysis, evaluation, and/or other processing of the network addresses being monitored by network activity monitoring subsystem 210 in order to determine whether these network addresses are information security threats and/or whether remediation response(s) are warranted and/or required. In some instances, this may include evaluating the network addresses using evaluation criteria that take into account various factors (which may, e.g., evaluate activity associated with each of the network addresses over various periods of time). In some situations, this evaluation may occur once a certain, threshold amount of monitoring is completed, but in many situations, monitoring may continue after an initial evaluation is performed, and subsequently-collected data may be used in reevaluating a particular network address at a later time. In some instances, this evaluation may include evaluating one or more other network addresses from the same net block (e.g., from the same grouping, subnet, range, and/or block of network addresses, such as a netblock of IP addresses), and threat evaluation subsystem 215 may be configured to access and/or load information about a net block, determine what other network addresses are included in the net block, and subsequently evaluate these other network addresses when evaluating a particular network address that is included in the net block. Additional details and examples of how such a network address may be evaluated, and how an information security threat may be identified, are discussed in greater detail below with respect to FIG. 3.

Continuing to refer to FIG. 2, threat remediation subsystem 220 may be configured to cause one or more remediation actions to be performed based on a determination (e.g., by threat evaluation subsystem 215) that a particular network address represents an information security threat. For example, for a network address that has been determined to represent an information security threat, threat remediation subsystem 220 may look up and/or otherwise determine provider information for the network address, select and/or load a notification template to be used in contacting the provider of the address (e.g., based on provider information that might indicate a particular destination country and/or language template to use, based on the type of incident, and/or based on other factors), generate a notification based on the template, and send the notification to the provider. Additionally or alternatively, threat remediation system 220 may, for example, periodically revaluate network addresses with respect to which notifications have been sent, so as to determine whether the incidents associated with the addresses have been resolved (e.g., whether a particular address has been taken offline, blocked, and/or otherwise disabled) or if additional remediation actions should be taken (e.g., whether follow-up messages should be sent, whether the incident should be escalated, and/or the like).

In some embodiments, incident database 225 may be configured to maintain historical data about the various network addresses that have been identified (e.g., the various network addresses that have been identified as being associated with information security incidents) and/or evaluated, including information about the types of incidents and/or threats that have been linked to these network addresses. For example, incident database 225 may be used by system 200 and/or its various subsystems in determining which network addresses have been associated with particular incidents. In some instances, incident database 225 may be populated by incident information receiving subsystem 205 as information about various network addresses is received. Additionally or alternatively, incident database 225 may be updated by network activity monitoring subsystem 210 as network activity for the various network addresses is monitored.

In some embodiments, remediation database 230 may be configured to maintain information about various network addresses that are in remediation. For example, remediation database 230 may store information about network addresses that have been identified as threats (e.g., by threat evaluation subsystem 215) and for which remediation actions have been, or are to be, taken (e.g., by threat remediation subsystem 220). For instance, for a particular network address included in the database, remediation database 230 may include information identifying a provider of the network address, information specifying what (if any) notification(s) have been sent to the provider, information specifying what stage of remediation the network address is considered to be in, information indicating whether the information security threat associated with the network address has been resolved, information indicating when the network address was last checked and/or otherwise evaluated to determine whether the network address still represented an information security threat, and/or other information associated with the network address and/or the remediation process.

In some embodiments, notification templates library 235 may be configured to store information about various templates that may be used in generating and/or sending notifications. For example, notification templates library 235 may store templates that are used, for example, by threat remediation subsystem 220 in generating and/or sending notifications to providers of network addresses that have been determined to represent information security threats. In some instances, different templates may be created, defined, and/or stored for different providers, countries, languages, remediation stages, and/or other circumstances. In addition, notification templates library 235 may store and/or otherwise maintain these templates so that, in a particular instance, threat remediation subsystem 220 can select an appropriate template that best matches the circumstances of a particular information security incident that may be being addressed.

As indicated above, these are examples of the subsystems, databases, libraries, and/or other elements that may be included in system 200 in some embodiments, as well as some of the functions that may be performed (e.g., by system 200 and its various subsystems). In other embodiments, additional and/or alternative subsystems, databases, libraries, and/or other elements may similarly be included, and/or other functions may be performed, in addition to and/or instead of those discussed above.

Having described an example system that may be used in handling information security incidents in some embodiments, an example of a method that may, in some embodiments, be performed (e.g., by such a system 200; by another computing device, such as computing device 101; and/or the like) will now be discussed in greater detail with respect to FIG. 3.

Figure 3:
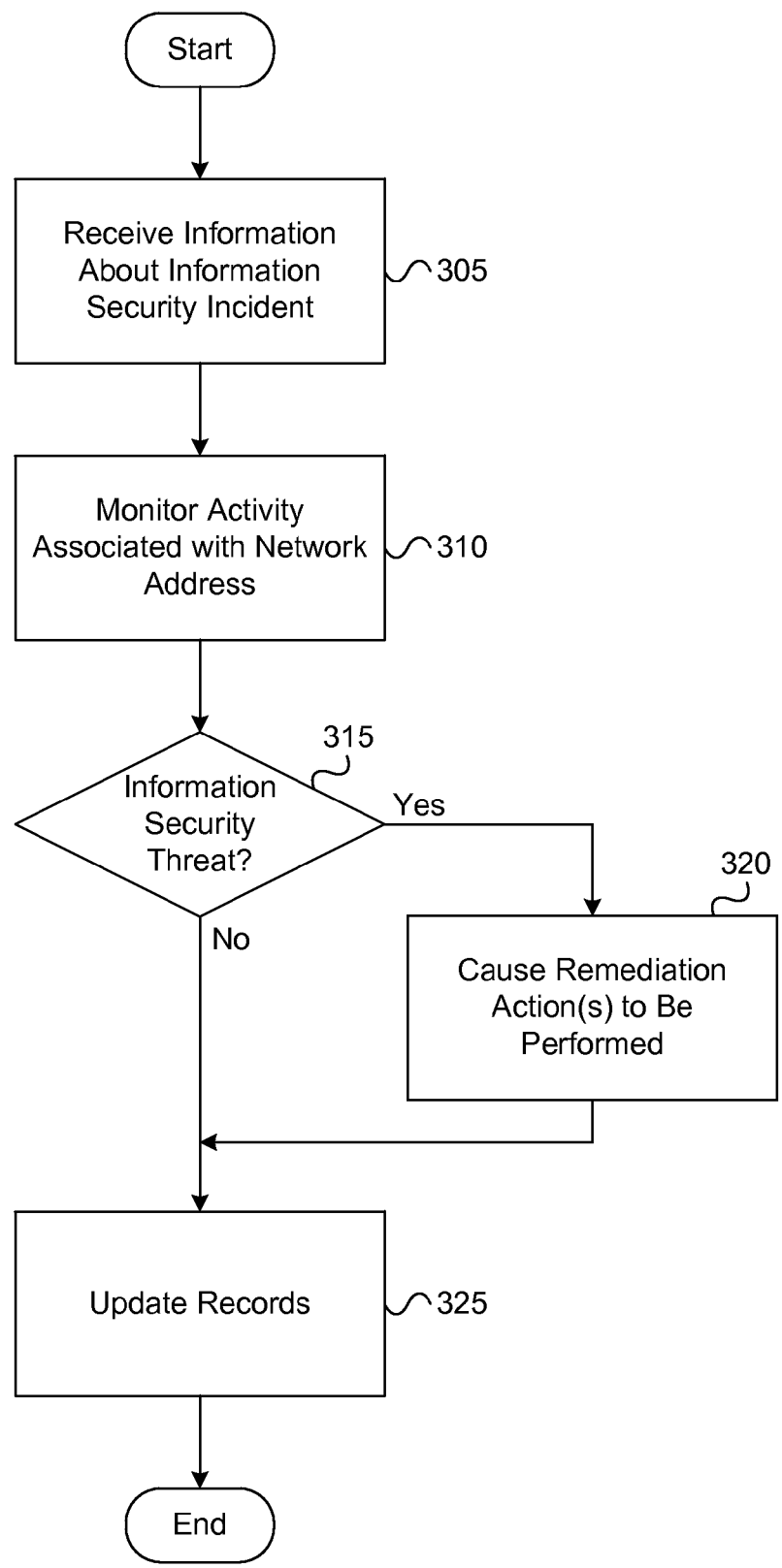
FIG. 3 illustrates a flowchart that depicts a method of handling information security incidents according to one or more embodiments.

FIG. 3 illustrates a flowchart that depicts a method of handling information security incidents according to one or more embodiments. In some embodiments, the example method illustrated in FIG. 3 may be performed by a computing device, which may include and/or implement one or more aspects of computing device 101. In additional and/or alternative embodiments, the example method illustrated in FIG. 3 may be performed by a computer system, such as system 200. In other embodiments, the example method illustrated in FIG. 3 may be implemented in and/or may otherwise be embodied in computer-readable instructions that may be stored in a computer-readable medium, such as a memory.

As seen in FIG. 3, the method may be initiated in step 305, in which information about an information security incident may be received. For example, in step 305, a computing device may receive information indicating that a particular network address is associated with an information security incident. This information may, for example, include identification information for the network address (e.g., an alphanumeric string representing the address, which may, e.g., be an IP address), the time that the incident occurred and/or was detected, the type of incident that occurred and/or was detected (e.g., a denial of service attack, phishing attempt, and/or the like), and/or any other data that has been collected and/or otherwise obtained with respect to the incident (e.g., any other data that has been collected and/or obtained by the computing device and/or by a detection system from which this information may be received by the computing device).

In some instances, the information security incident may be a denial of service attack, and the network address may be an IP address that is assigned to and/or used by a computing device that was part of (and/or used in carrying out) the denial of service attack. In other instances, the information security incident (e.g., the information security incident for which information is received in step 305) may be of another type. For example, in some instances, the information security incident may be a phishing attempt, and the network address may be an IP address that is assigned to and/or used by a computing device that was hosting a phishing page and/or otherwise used in carrying the phishing attempt.

As indicated above, any and/or all of the information that may be received in step 305 (e.g., information identifying the network address and/or any other information about the attack) may, in some instances, be received from a detection system that provides information about various attacks and/or other information security incidents. In other instances, the computing device may itself determine that an attack or other information security incident has occurred, and may further determine that such an attack or other information security incident involved a particular network address (e.g., based on data packets and/or other communications received from and/or sent to the network address).

In step 310, activity associated with the network address may be monitored. For example, in step 310, the computing device may collect and/or compile records about various inbound and/or outbound communications between the network address and various systems that are operated by the organization and/or are being monitored (e.g., by the computing device, by the detection system, and/or the like). In some instances, the computing device may track, collect, and/or compile these records itself, while in other instances, the computing device may communicate with one or more other systems to obtain access logs and/or other records that include information about these communications. In some cases, the computing device may thus obtain records that reflect all inbound and/or outbound communications between any and/or all of the various computer systems that may be operated by the organization or other entity that operates and/or controls the computing device. In some embodiments, this might include obtaining records for any and/or all of the systems associated with an enterprise computing platform that is operated and/or controlled by a large organization, such as a financial institution.

In step 315, it may be determined whether the network address represents an information security threat. For example, in step 315, the computing device may determine, based on the monitoring performed in step 310, whether the network address represents an information security threat. In some embodiments, this determination may be made while the monitoring is still underway, while in other embodiments, this determination may be made once the monitoring is complete. For example, monitoring the activity associated with the network address may, in some instances, include periodically updating records for network activity associated with the network address over a period of time. In these instances, determining whether the network address represents an information security threat may include periodically evaluating the records for network activity associated with the network address during the period of time.

In some embodiments, determining whether the network address represents an information security threat may include evaluating one or more remediation criteria. These remediation criteria may, for example, define various factors that can be evaluated by the computing device in analyzing a particular network address, and in some instances, may relate to the monitored activity associated with the particular network address over a particular period of time. Some examples of the factors that may be included in the remediation criteria include: whether the network address has been used in an attack and/or otherwise involved in an information security incident before; what the relationship of the network address is to the computing device and/or the organization or other entity operating the computing device (e.g., whether the network address belongs to a partner, client, associate, and/or the like of the organization); what type of address the network address is (e.g., business, residential, other); what country the network address is located in; and/or what services the network address provides (e.g., whether the network address has web ports, such as port 80, open). While these are examples of some of the factors that may be included in the remediation criteria in some embodiments, in other embodiments, additional and/or alternative factors may similarly be included in the remediation criteria in addition to and/or instead of those discussed here.

In some embodiments, based on the evaluation of these remediation criteria, a score may be determined (e.g., by the computing device in step 315) for the network address. Additionally, if the score meets or exceeds a predetermined threshold, then it may be determined (e.g., by the computing device) that the network address represents an information security threat. To calculate this score, numerical values may be assigned to each option of a set of predetermined options that may be assigned to and/or otherwise associated with each possible result of each criterion. Based on the particular evaluation results for each criterion (e.g., as determined by the computing device in evaluating the remediation criteria), an overall score may be calculated by summing the resultant individual values for each criterion. Additionally or alternatively, in some instances, each criterion may be assigned a predetermined weight, which may be used in weighting the individual evaluation results for each criterion prior to determining the overall score. For example, a criterion that evaluates whether a particular network address has been used in a previous attack or otherwise involved in a previous information security incident may be weighted relatively highly, such that if the particular network address has been involved in a previous attack or other incident, the network address will receive a relatively high score, regardless of the other criteria and/or factors.

In some embodiments, the remediation criteria also may account for network activity that originates from and/or is otherwise associated with other network addresses that are located in the same net block as the network address being evaluated (e.g., other network addresses that are located in the same net block as the network address being evaluated by the computing device in step 315). For example, the network address may, in some instances, be located in a first net block, and evaluating one or more remediation criteria may include analyzing network activity for one or more other network addresses that are located within the first net block. In evaluating such network activity for the other network addresses, the computing device may analyze network activity during the same time period (e.g., during the same time period in which activity for the particular network address being evaluated in step 315 occurred and/or was observed and/or monitored) or during a different time period.

In these ways, attacks and/or other incidents originating from and/or otherwise involving different network addresses (which may, e.g., be IP addresses, as discussed above) in a single net block may be compiled and considered together in order to identify them all as an information security threat and/or otherwise deserving of a remediation response. In some instances, this grouping may provide a more efficient and/or effective way of analyzing and/or classifying network addresses, as people who compromise computer networks (and who subsequently use such networks in carrying out attacks and/or other information security incidents) tend to compromise entire networks of the same type (e.g., of the same subnet, at the same company, and/or the like). Thus, there is often a strong correlation between suspicious and/or threatening activity originating from one network address and other activity that is detected and/or received with respect to other network addresses in the same net block.

As in the other cases discussed above, after evaluating the various remediation criteria (including, for instance, criteria that evaluate other network addresses that are located in the same net block), an overall score may be determined for the network address, similar to how such a score may be determined in the examples above. Additionally, if the score exceeds a predetermined threshold, then the network address may be determined to be an information security threat, which may result in additional actions (such as remediation actions) being taken and/or performed, as discussed in greater detail below. If the score does not exceed the threshold, then information about the network address (such as the activity information used in the evaluations, the evaluation results, and/or any other information associated with the network address) may, for example, be stored in a database (e.g., incident database 225) and/or otherwise used as a data point in future analysis (including future analysis of the same network address and/or future analysis of other, different network addresses).

In some embodiments, a particular network address may be evaluated over a period of time (e.g., rather than at a single point in time). More particularly, determining whether the network address represents an information security threat may include reevaluating the one or more remediation criteria after a period of time. For example, various data points for activity associated with various network addresses in a database (e.g., incident database 225) may continue to be analyzed (e.g., by the computing device) after their initial entry into the database for a predetermined period of time (e.g., one week, one month, and so on). In some instances, this reevaluation may work in combination with the evaluation of different network addresses in the same net block so as to more efficiently and effectively provide threat identification and incident handling functionalities.

For example, if a first network address is evaluated and/or scored on a particular day and determined to be below a threshold, but another network address from the same net block is involved in an attack or some other information security incident a few days later, then the first network address may be reevaluated after and/or as a result of the subsequent attack or incident by the other network address. Additionally, when the first network address is reevaluated (e.g., by the computing device), the first network address may now be determined to exceed the threshold, as a result of the other activity originating from the same net block being taken into account during the reevaluation process. And, because the first network address now exceeds the threshold, the first network address (and potentially, the other network address from the same net block that was involved in the most recent attack or other information security incident) may be flagged and/or otherwise determined to be an information security threat, even though the first network address did not initially exceed the threshold or rise to this level when it was first evaluated. In other words, in some embodiments, the computing device may determine, in reevaluating a particular network address, that the network address exceeds the threshold as a result of other activity that has been monitored and/or observed for other network addresses located in the same net block during a particular period of time.

In some embodiments, the computing device may determine that one or more other network addresses are located in the same net block as the network address being evaluated (namely, the network address being evaluated in step 315) based on information that may be determined and/or obtained from another system or service that may provide specifications for various network address blocks (including various IP address blocks). Such information may, for example, include a listing of various network service providers (including Internet Service Providers (ISPs)) and the particular network addresses (and/or IP addresses) that each service provider has been allocated. In particular, the network addresses that each service provider has been allocated may represent the complete set of network addresses that each service provider can assign to the various systems and devices to which each service provider provides network connectivity. As a result, the computing device can use this information to determine what network addresses may be grouped into which net blocks, as well as what other network addresses may be part of the same net block as the network address being evaluated (namely, the network address being evaluated by the computing device in step 315).

By using this grouping in evaluating network addresses, the computing device can enable the analysis being performed to build on itself as additional information is collected for various communications and/or for various network addresses. For instance, as illustrated in the examples above, some network addresses will meet a threshold (and accordingly be determined to be information security threats) once a sufficient amount of data is gathered, even though these network addresses might not meet such a threshold when they are initially evaluated by the computing device. As a result of the grouping, however, remediation actions may be performed (or may be caused to performed) in situations where such remediation may be desired, even if this was not initially apparent.

If it is determined, in step 315, that the network address represents an information security threat, then in step 320, one or more remediation actions may be performed. For example, in step 320, the computing device may cause one or more remediation actions to be performed in response to determining (e.g., in step 315) that the network address represents an information security threat. In some instances, in causing one or more remediation actions to be performed, the computing device may look up and/or otherwise obtain information about a service provider associated with the network address, and subsequently may execute a number of steps to notify the provider about the threat. For example, after looking up and/or otherwise obtaining such provider information, the computing device may select a notification template (e.g., from a library of notification templates, such as notification templates library 235) based on the provider information and the network address, generate a notification based on the selected template and the provider information, and subsequently send the notification to the service provider that is hosting and/or otherwise associated with the network address.

In some embodiments, causing one or more remediation actions to be performed also may include periodically reevaluating the network address and, if appropriate, sending one or more follow-up messages. For example, in sending one or more follow-up messages after such reevaluation, the computing device may, in some instances, select another notification template based on the provider information, generate another notification based on the selected notification template and the provider information, and send the generated notification to the provider.

In some embodiments, different templates may be defined, maintained, and/or used by the computing device for different notifications that may be sent by the computing device (e.g., in causing one or more remediation actions to be performed in step 320). For example, different templates may be defined, maintained, and/or used by the computing device based on the destination country of the notification (which may, e.g., be determined based on the country in which the network address is located and/or based on the country in which the provider of the network address is located, as may be indicated in provider information obtained by the computing device). For instance, English-language templates may be defined, maintained, and/or used for notifications to be sent to English-speaking destination countries, Chinese-language templates may be defined, maintained, and/or used for notifications to be sent to Chinese-speaking destination countries, and Russian-language templates may be defined, maintained, and/or used for notifications to be sent to Russian-speaking countries. Additionally or alternatively, different templates may be defined, maintained, and/or used (e.g., by the computing device) based on the stage of remediation that a particular network address may be in. For example, different email templates may be defined, maintained, and/or used for the initial notification about an information security threat, a first reminder about the threat, a second reminder about the threat, a third reminder about the threat, and a final letter regarding the threat (which may, e.g., indicate that legal action may be initiated). Additionally or alternatively, different templates may be defined, maintained, and/or used by the computing device based on the type of information security threat being handled (e.g., based on whether the information security threat is a denial of service attack, a phishing scheme, and/or another type of information security threat).

In some embodiments, the computing device may periodically reevaluate a particular information security threat to determine whether the threat has been resolved (e.g., after one or more notifications have been sent and/or after one or more other remediation actions have been performed). For example, after initially performing (or causing the performance of) one or more remediation actions, the computing device may continuously monitor the network address associated with the information security threat in order to detect any changes in status and periodically reevaluate whether the network address still represents an information security threat. If, during this reevaluation, the computing device determines that the network address still represents an information security threat, then the computing device may escalate the remediation stage in which the network address is classified (which may, e.g., result in a reminder notification or another type of notification being sent to the provider associated with the network address and/or in one or more other actions). Alternatively, if the computing device determines that the network address no longer represents an information security threat, then the computing device may determine not to send any additional notifications with respect to the network address (at least for the time being, e.g., with respect to the present information security incident associated with the network address). In both cases, information about the network address, including status data about the current state of the network address (and/or any other information obtained and/or generated during monitoring and/or evaluation of the network address) may be kept and/or maintained for future analysis and/or historical purposes.

In step 325, one or more records for the network address may be updated. For example, in step 325, the computing device may create, define, modify, and/or otherwise update information the current state of the network address, as well as the results of any analysis, evaluation, and/or reevaluation of the network address and/or any other information that has been obtained regarding the network address. The computing device may, for example, store any and/or all of this information in one or more databases, such as the incident database 225 and/or the remediation database 230 discussed above.

Subsequently, the method may end. As illustrated in the examples above, however, certain aspects of the monitoring and evaluation may repeated (e.g., in reevaluating a previously identified information security incident or an open and/or otherwise pending information security threat). For instance, some aspects of the monitoring and evaluation may be repeated so as to determine whether a certain information security incident has risen to the level of being classified as an information security threat (e.g., and thus warranting a remediation response) and/or to determine whether a previously identified information security threat has been resolved (e.g., as a result of previous remediation actions). Additionally or alternatively, the computing device may perform similar steps as those illustrated in FIG. 3 and discussed above in handling other information security incidents associated with other network addresses.

Having described several examples of the processing that may be performed by a computing device in handling information security incidents in some embodiments, several example user interfaces that might be displayed and/or otherwise provided by a computing device, such as computing device 101 and/or system 200, in performing such processing and/or in otherwise handling information security incidents will now be discussed with respect to FIGS. 4 and 5.

Figure 4:
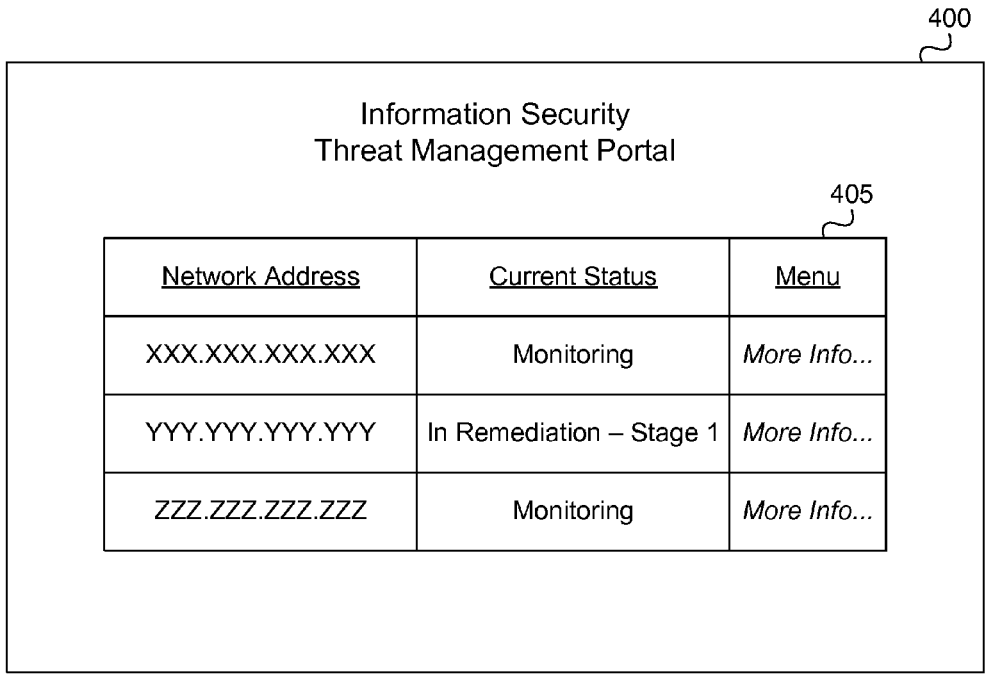
FIG. 4 illustrates an example of a user interface that may be displayed in providing status information about information security incidents in one or more embodiments.

FIG. 4 illustrates an example of a user interface that may be displayed in providing status information about information security incidents in one or more embodiments. As seen in FIG. 4, in some instances, a computing device implementing one or more aspects of the disclosure (e.g., computing device 101, system 200, and/or the like) may display and/or otherwise provide a user interface 400 that includes a portal in which information about various information security incidents and/or information security threats being monitored, evaluated, and/or otherwise handled by the computing device can be displayed.

In some arrangements, user interface 400 may include a table 405 in which such information about a number of information security incidents and/or information security threats is displayed. For example, for each information security incident and/or information security threat being monitored, table 405 may include a network address associated with the incident and/or threat (which may, in some instances, be an IP address), a current status of the incident and/or threat (e.g., indicating whether the network address has been identified as being involved in an information security incident and is being monitored, but might not have yet been identified as representing an information security threat; indicating whether the network address has been flagged as an information security threat and/or is in a particular stage of remediation; and/or the like). Additionally or alternatively, table 405 may include a menu button for each network address listed in the table 405. Such a menu button may, when selected, cause the computing device to display additional information about a particular network address, such as provider information associated with the network address, monitoring information associated with the network address, the result of any evaluation conducted with respect to the network address, and/or any other information that has been generated, collected, or otherwise obtained with respect to the network address.

Figure 5:
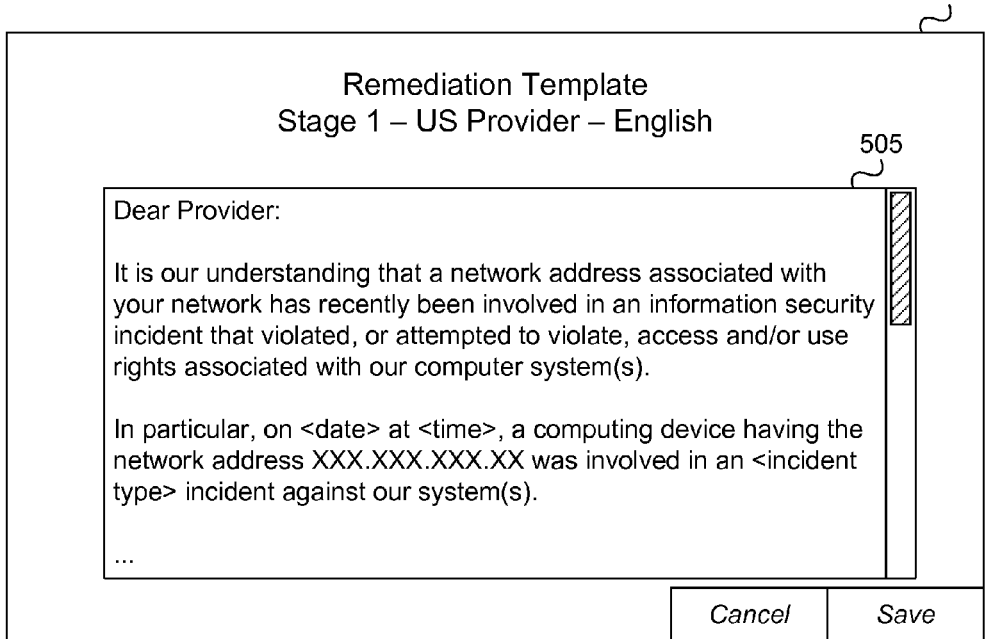
FIG. 5 illustrates an example of a user interface that may be displayed in creating and/or modifying a remediation template in one or more embodiments.

FIG. 5 illustrates an example of a user interface that may be displayed in creating and/or modifying a remediation template in one or more embodiments. As seen in FIG. 5, in some instances, a computing device implementing one or more aspects of the disclosure (e.g., computing device 101, system 200, and/or the like) may display and/or otherwise provide a user interface 500 that includes a remediation template that may be used by the computing device. Such a user interface may, for example, enable a user of the computing device to create, view, and/or modify such a notification template.

In some arrangements, user interface 500 may include a text region 505 in which the text, graphic, and/or other content associated with the notification template may be displayed and/or otherwise included. In defining the template, a user of the computing device may, for example, input (into text region 505) various tags that can be used in specifying variable fields that can be filled in by the computing device when sending a notification based on the template. For example, such text may include tags for the incident data, incident time, the network address, the incident type, and/or other variable information that may be inserted into a notification by the computing device as may be appropriate in a particular situation. Additionally, user interface 500 may include a save button 515 and a cancel button 520 that may, for example, enable a user to save changes to the template and/or close the user interface without saving changes, respectively.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computing device, comprising:
at least one processor; and
memory storing computer readable instructions that, when executed by the at least one processor, cause the computing device to:
receive information indicating that a network address is associated with an information security incident;
monitor activity associated with the network address, wherein the network address is located in a first net block, and wherein the first net block comprises a group of internet protocol (IP) addresses associated with a particular network service provider;
determine, based on the monitoring, whether the network address associated with the information security incident represents an information security threat, wherein the determining whether the network address represents the information security threat includes evaluating one or more remediation criteria, and wherein the evaluating the one or more remediation criteria includes analyzing network activity for multiple other network addresses that are located within the first net block; and
cause one or more remediation actions to be performed in response to determining that the network address represents the information security threat,
wherein the monitored activity associated with the network address is compiled with the network activity for the multiple other network addresses that are located within the first net block to determine whether aggregate activity associated with the first net block represents the information security threat,
wherein the monitoring the activity associated with the network address includes periodically updating records for network activity associated with the network address over a period of time, and
wherein the determining whether the network address represents the information security threat includes periodically evaluating the records for the network activity associated with the network address during the period of time.

2. The computing device of claim 1, wherein the information security incident is a denial of service attack.

3. The computing device of claim 1, wherein the determining whether the network address represents the information security threat includes reevaluating the one or more remediation criteria after the period of time.

4. The computing device of claim 1, wherein the causing the one or more remediation actions to be performed includes:
selecting a notification template based on provider information associated with the network address;
generating a notification based on the notification template and the provider information;
sending the notification to a provider associated with the network address;
after sending the notification, determining whether the network address still represents the information security threat; and
in response to determining that the network address still represents the information security threat:
selecting a second notification template based on the provider information;
generating a second notification based on the notification template and the provider information; and
sending the second notification to the provider.

5. The computing device of claim 1, wherein the network activity for the multiple other network addresses that are located within the first net block is monitored during a time period in which the activity associated with the network address is monitored.

6. The computing device of claim 1, wherein the network activity for the multiple other network addresses that are located within the first net block is monitored during a different time period than a time period in which the activity associated with the network address is monitored.

7. A method, comprising:
receiving, by a computing device, information indicating that a network address is associated with an information security incident;
monitoring, by the computing device, activity associated with the network address, wherein the network address is located in a first net block, and wherein the first net block comprises a group of internet protocol (IP) addresses associated with a particular network service provider;
determining, by the computing device, based on the monitoring, whether the network address associated with the information security incident represents an information security threat, wherein the determining whether the network address represents the information security threat includes evaluating one or more remediation criteria, and wherein the evaluating the one or more remediation criteria includes analyzing network activity for multiple other network addresses that are located within the first net block; and
in response to determining that the network address represents the information security threat, causing, by the computing device, one or more remediation actions to be performed,
wherein the monitored activity associated with the network address is compiled with the network activity for the multiple other network addresses that are located within the first net block to determine whether aggregate activity associated with the first net block represents the information security threat,
wherein the monitoring the activity associated with the network address includes periodically updating records for network activity associated with the network address over a period of time, and
wherein the determining whether the network address represents the information security threat includes periodically evaluating the records for the network activity associated with the network address during the period of time.

8. The method of claim 7, wherein the information security incident is a denial of service attack.

9. The method of claim 8, wherein the determining whether the network address represents the information security threat includes reevaluating the one or more remediation criteria after the period of time.

10. The method of claim 7, wherein the causing the one or more remediation actions to be performed includes:
selecting a notification template based on provider information associated with the network address;
generating a notification based on the notification template and the provider information;
sending the notification to a provider associated with the network address;
after sending the notification, determining whether the network address still represents the information security threat; and
in response to determining that the network address still represents the information security threat:
selecting a second notification template based on the provider information;
generating a second notification based on the notification template and the provider information; and
sending the second notification to the provider.

11. The method of claim 7, wherein the network activity for the multiple other network addresses that are located within the first net block is monitored during a time period in which the activity associated with the network address is monitored.

12. The method of claim 7, wherein the network activity for the multiple other network addresses that are located within the first net block is monitored during a different time period than a time period in which the activity associated with the network address is monitored.

13. One or more non-transitory computer-readable media having computer-executable instructions stored thereon that, when executed by a computing device, cause the computing device to:
receive information indicating that a network address is associated with an information security incident;
monitor activity associated with the network address, wherein the network address is located in a first net block, and wherein the first net block comprises a group of Internet protocol (IP) addresses associated with a particular network service provider;
determine, based on the monitoring, whether the network address associated with the information security incident represents an information security threat, wherein the determining whether the network address represents the information security threat includes evaluating one or more remediation criteria, and wherein the evaluating the one or more remediation criteria includes analyzing network activity for multiple other network addresses that are located within the first net block; and
cause one or more remediation actions to be performed in response to determining that the network address represents the information security threat,
wherein the monitored activity associated with the network address is compiled with the network activity for the multiple other network addresses that are located within the first net block to determine whether aggregate activity associated with the first net block represents the information security threat,
wherein the monitoring the activity associated with the network address includes periodically updating records for network activity associated with the network address over a period of time, and
wherein the determining whether the network address represents the information security threat includes periodically evaluating the records for the network activity associated with the network address during the period of time.

14. The one or more non-transitory computer-readable media of claim 13, wherein the information security incident is a denial of service attack.

15. The one or more non-transitory computer-readable media of claim 13, wherein the determining whether the network address represents the information security threat includes reevaluating the one or more remediation criteria after the period of time.

16. The one or more non-transitory computer-readable media of claim 13, wherein the causing the one or more remediation actions to be performed includes:
selecting a notification template based on provider information associated with the network address;

generating a notification based on the notification template and the provider information;

sending the notification to a provider associated with the network address;

after sending the notification, determining whether the network address still represents the information security threat; and in response to determining that the network address still represents the information security threat:

selecting a second notification template based on the provider information;

generating a second notification based on the notification template and the provider information; and sending the second notification to the provider.

17. The one or more non-transitory computer-readable media of claim 13, wherein the network activity for the multiple other network addresses that are located within the first net block is monitored during a time period in which the activity associated with the network address is monitored.

18. The one or more non-transitory computer-readable media of claim 13, wherein the network activity for the multiple other network addresses that are located within the first net block is monitored during a different time period than a time period in which the activity associated with the network address is monitored.

* * * * *